US010982471B2

(12) United States Patent
Emrich et al.

(10) Patent No.: US 10,982,471 B2
(45) Date of Patent: Apr. 20, 2021

(54) INDEPENDENT INTERNAL AND EXTERNAL DOOR LATCH ACTUATION MECHANISMS

(71) Applicant: Textron Innovations Inc., Providence, RI (US)

(72) Inventors: Joshua Andrew Emrich, Grapevine, TX (US); Theo Theofilopoulos, St-Colomban (CA); Richard Vincent, St-Jerome (CA)

(73) Assignee: Textron Innovations Inc., Providence, RI (US)

( * ) Notice: Subject to any disclaimer, the term of this patent is extended or adjusted under 35 U.S.C. 154(b) by 765 days.

(21) Appl. No.: 15/804,168

(22) Filed: Nov. 6, 2017

(65) Prior Publication Data

US 2019/0136584 A1   May 9, 2019

(51) Int. Cl.
*E05B 77/30* (2014.01)
*B64C 1/14* (2006.01)
(Continued)

(52) U.S. Cl.
CPC ............ *E05B 77/30* (2013.01); *B64C 1/1423* (2013.01); *E05B 13/004* (2013.01); *E05B 79/20* (2013.01); *E05B 85/12* (2013.01); *E05C 9/08* (2013.01)

(58) Field of Classification Search
CPC ........ E05B 79/20; E05B 85/12; E05B 13/004; E05B 77/30; E05B 13/002; E05B 15/004;
(Continued)

(56) References Cited

U.S. PATENT DOCUMENTS 5,156,359 A    10/1992   Noble et al.
5,305,969 A     4/1994   Odell et al.
(Continued)

FOREIGN PATENT DOCUMENTS

CN    101975008 A    2/2011
CN    102442420 A    5/2012
(Continued)

OTHER PUBLICATIONS

European Search Report; Application No. 17204535.3, European Patent Office, dated Feb. 5, 2018.
(Continued)

*Primary Examiner* — Christine M Mills
(74) *Attorney, Agent, or Firm* — Lawrence Youst PLLC (57) ABSTRACT

A latch system includes an actuation module having first and second actuation mechanisms. The first actuation mechanism includes a first handle, a lock tab and an inner rod coupled together. The second actuation mechanism includes at least one second handle, a conversion block and an outer rod coupled together with the outer rod and the conversion block each having a slot. At least one latch module has a retractable latch. A control cable connects the conversion block and the latch module such that rotation of the conversion block in a first direction retracts the latch. A lock is operably engagable with the lock tab to selectively allow and prevent rotation of the inner rod. Rotation of the inner rod in the first direction rotates the conversion block. Rotation of the outer rod in the first direction rotates the conversion block without rotating the inner rod.

20 Claims, 7 Drawing Sheets

(51) Int. Cl.
*E05B 79/20* (2014.01)
*E05B 85/12* (2014.01)
*E05B 13/00* (2006.01)
*E05C 9/08* (2006.01)

(58) Field of Classification Search
CPC ...... E05B 53/00; E05B 53/003; E05B 53/005; E05B 63/14; E05B 63/16; E05B 79/12; E05B 65/1033; E05C 9/085; E05C 9/08; E05C 9/00; E05C 9/046; E05C 9/10; E05C 9/24; B64C 1/1407; B64C 1/1423; B64C 1/143; B64C 1/1438; B64C 1/1461; B64C 1/14; B64C 1/32; B64C 1/1484; Y10S 292/03; Y10S 292/62; Y10T 292/57; Y10T 292/0834; Y10T 292/0836; Y10T 292/0841; Y10T 292/0962; Y10T 292/0967; Y10T 292/1017; E05Y 2201/214; E05Y 2800/25
USPC .......... 292/336.3, 32, 33, 38, 157, 161, 141, 292/DIG. 3, DIG. 62; 244/129.5; 49/141
See application file for complete search history.

(56) References Cited

U.S. PATENT DOCUMENTS

| | | |
|---|---|---|
| 5,636,814 A | 6/1997 | Rollert |
| 5,826,824 A * | 10/1998 | Martin ................. B64C 1/32 244/129.3 |
| 8,672,271 B2 | 3/2014 | Gorgoglione |
| 8,752,793 B2 | 6/2014 | Gorgoglione |
| 8,752,794 B2 | 6/2014 | Gorgoglione |
| 9,309,701 B2 * | 4/2016 | Jeffries ................. B25H 3/02 |
| 9,604,713 B2 | 3/2017 | Pothier |
| 2001/0027667 A1 * | 10/2001 | Pinkow ................. E05C 3/24 70/208 |
| 2008/0001412 A1 | 1/2008 | Nozawa et al. |
| 2011/0049299 A1 | 3/2011 | Gowing et al. |
| 2014/0259935 A1 | 9/2014 | Steger et al. |
| 2018/0195324 A1 | 7/2018 | Amante et al. |

FOREIGN PATENT DOCUMENTS

| | | |
|---|---|---|
| CN | 101896400 B | 3/2014 |
| CN | 105752312 A | 7/2016 |
| EP | 1999324 A2 | 12/2008 |
| WO | 0104442 A1 | 1/2001 |

OTHER PUBLICATIONS

European Search Report; Application No. 18195576.6; European Patent Office; dated Feb. 21, 2019.
CN Search Report; Application No. 201811294181.8, CNIPA, dated Mar. 3, 2020.

* cited by examiner

INDEPENDENT INTERNAL AND EXTERNAL DOOR LATCH ACTUATION MECHANISMS

TECHNICAL FIELD OF THE DISCLOSURE

The present disclosure relates, in general, to door latch systems for use on aircraft to selectively secure an aircraft door to the airframe in a closed position and, in particular, to a door latch system having an interior door latch actuation mechanism that operates independently of an exterior door latch actuation mechanism.

BACKGROUND

Hinged doors are commonly used on aircraft, such as rotorcraft including helicopters, to enable ingress into and egress from the aircraft. It is particularly important that the doors of such aircraft do not accidentally open during flight. To achieve this requirement, aircraft doors typically have a door latch system disposed within the interior of the door that secures the door in the closed position to the airframe of the aircraft. Such door latch systems commonly include locking mechanisms that can be positioned to prevent actuation of the door latch systems and thus prevent the opening of an aircraft door. These locking mechanisms serve the essential function of preventing unauthorized entry into the aircraft to protect the aircraft from unauthorized use and to protect the contents stored within the aircraft.

It has been found, however, that locking mechanisms for door latch systems of an aircraft can become a safety hazard if such locking mechanisms are engaged when emergency egress from the aircraft is required. Accordingly, a need has arisen for a door latch system for an aircraft that is operable to secure the door in the closed position to the airframe during flight. A need has also arisen for such a door latch system for an aircraft that includes a locking mechanism to prevent unauthorized access to the aircraft. In addition, a need has arisen for such a door latch system that does not prevent emergency egress from the aircraft even when the locking mechanism is engaged.

SUMMARY

In a first aspect, the present disclosure is directed to a latch system that includes an actuation module having first and second actuation mechanisms. The first actuation mechanism includes a first handle, a lock tab and an inner rod that are coupled together. The second actuation mechanism includes at least one second handle, a conversion block and an outer rod that are coupled together with the outer rod and the conversion block each having a slot. A latch module has a retractable latch. A control cable connects the conversion block and the latch module such that rotation of the conversion block in a first direction retracts the latch. A lock is operably engagable with the lock tab to selectively allow and prevent rotation of the inner rod. The inner rod is at least partially disposed within the outer rod with the lock tab at least partially disposed within the slot of the conversion block such that rotation of the inner rod in the first direction rotates the conversion block. Rotation of the outer rod in the first direction rotates the conversion block without rotating the inner rod such that the second actuation mechanism operates independently of the first actuation mechanism.

In some embodiments, the first actuation mechanism may be rotatable about an actuation axis and the second actuation mechanism may also be rotatable about the actuation axis. In certain embodiments, the latch system may include a plurality of latch modules each having a retractable latch and a plurality of control cable such that each control cable is connected between the conversion block and one of the latch modules such that rotation of the conversion block in the first direction retracts each of the latches. In some embodiments, when the lock is engaged, rotation of the first actuation mechanism is prevented which disables the first actuation mechanism from retracting the latch. In certain embodiments, when the lock is not engaged, rotation of the first actuation mechanism is allowed such that the first actuation mechanism may be operable to retract the latch. In some embodiments, when the lock is engaged, the second actuation mechanism may be operable to retract the latch and, when the lock is not engaged, the second actuation mechanism may be operable to retract the latch. In certain embodiments, the first handle may be an exterior handle and the second handle may be an interior handle.

In a second aspect, the present disclosure is directed to a door latch system for a door of an aircraft having an airframe. The door latch system includes an actuation module having first and second actuation mechanisms. The first actuation mechanism includes a first handle, a lock tab and an inner rod that are coupled together. The second actuation mechanism includes at least one second handle, a conversion block and an outer rod that are coupled together with the outer rod and the conversion block each having a slot. A latch module having a retractable door latch is operable to secure the door to the airframe in a closed position. A control cable connects the conversion block and the latch module such that rotation of the conversion block in a first direction retracts the door latch to release the door from the airframe. A lock is operably engagable with the lock tab to selectively allow and prevent rotation of the inner rod. The inner rod is at least partially disposed within the outer rod with the lock tab at least partially disposed within the slot of the conversion block such that rotation of the inner rod in the first direction rotates the conversion block. Rotation of the outer rod in the first direction rotates the conversion block without rotating the inner rod such that the second actuation mechanism operates independently of the first actuation mechanism.

In a third aspect, the present disclosure is directed to an aircraft door for hingeably coupling with an airframe of an aircraft. The aircraft door includes a door assembly and a door latch system supported by the door assembly. The door latch system includes an actuation module having first and second actuation mechanisms. The first actuation mechanism includes a first handle, a lock tab and an inner rod that are coupled together. The second actuation mechanism includes at least one second handle, a conversion block and an outer rod that are coupled together with the outer rod and the conversion block each having a slot. A latch module having a retractable door latch is operable to secure the door to the airframe in a closed position. A control cable connects the conversion block and the latch module such that rotation of the conversion block in a first direction retracts the door latch to release the door from the airframe. A lock is operably engagable with the lock tab to selectively allow and prevent rotation of the inner rod. The inner rod is at least partially disposed within the outer rod with the lock tab at least partially disposed within the slot of the conversion block such that rotation of the inner rod in the first direction rotates the conversion block. Rotation of the outer rod in the first direction rotates the conversion block without rotating the inner rod such that the second actuation mechanism operates independently of the first actuation mechanism.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
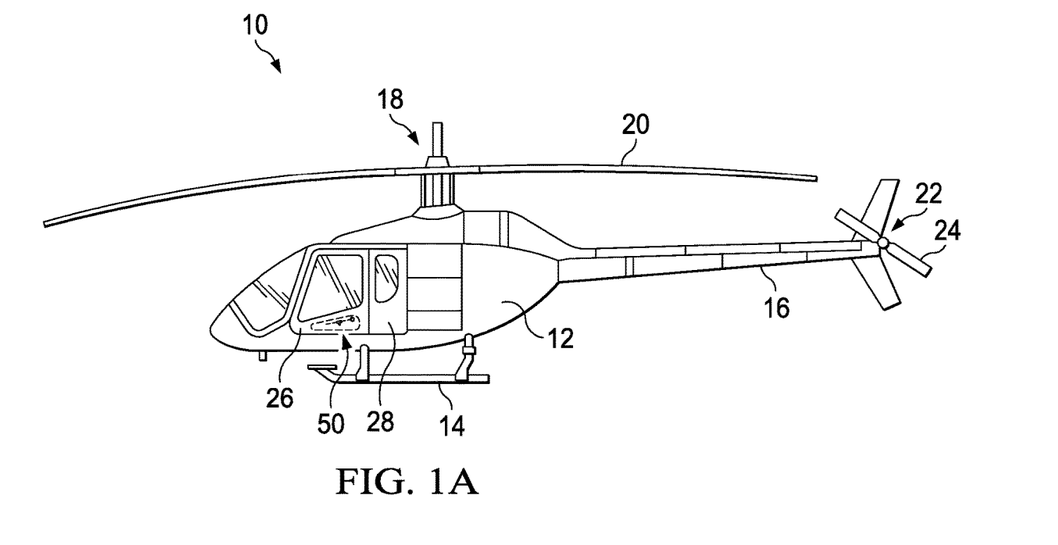
FIG. 1A-1B are schematic illustrations of a helicopter having an interior door latch actuation mechanism that operates independently of an exterior door latch actuation mechanism in accordance with embodiments of the present disclosure.
Figure 1B:
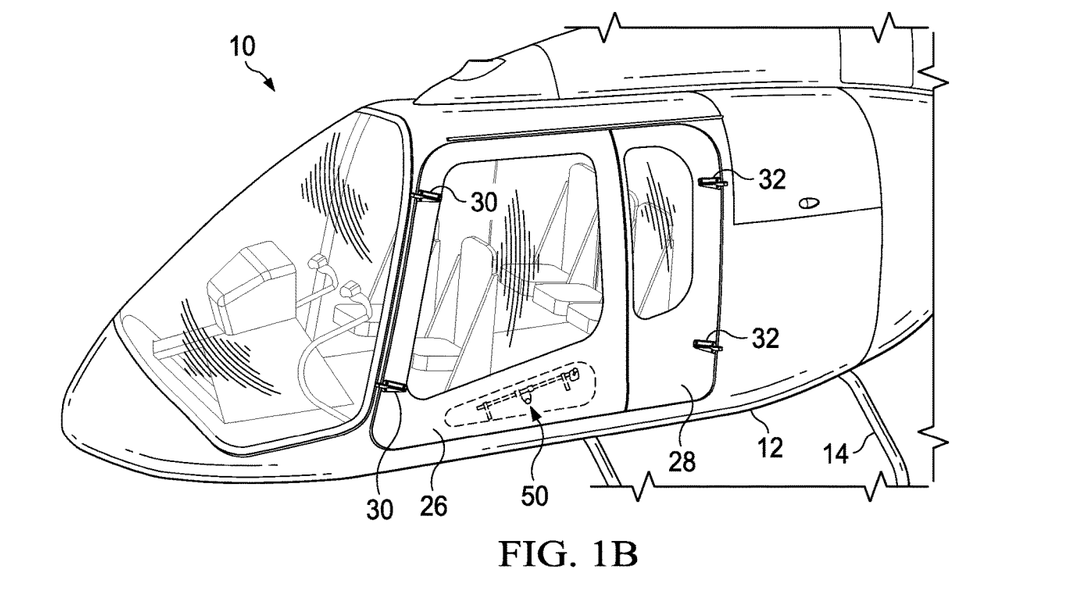

Referring to FIGS. 1A-1B in the drawings, a helicopter 10 is illustrated. Helicopter 10 includes a fuselage 12, a landing gear 14, a tail boom 16, a main rotor system 18 including main rotor blades 20 and a tail rotor system 22 including tail rotor blades 24. The main rotor blades 20 and the tail rotor blades 24 are rotated to selectively control the direction, thrust and lift of helicopter 10. In the illustrated embodiment, helicopter 10 includes a fore right door 26 and an aft right door 28. Similarly, helicopter 10 may include a fore left door and/or an aft left door. In such embodiments, the fore left door may be substantially similar to fore right door 26 and the aft left door may be substantially similar to aft right door 28 therefore, for sake of efficiency, certain features will be disclosed only with regard to fore right door 26 and/or aft right door 28. One having ordinary skill in the art, however, will fully appreciate an understanding of the fore left door and the aft left door based upon the disclosure herein of fore right door 26 and aft right door 28.

As illustrated, fore right door 26 is rotatably coupled to fuselage 12 via hinges 30 which allow an aft portion of the fore right door 26 to rotate away from fuselage 12. Also, the aft right door 28 is attached to the fuselage 12 via hinges 32 which allow a fore portion of aft right door 28 to rotate away from the fuselage 12. In the illustrated embodiment, aft right door 28 includes a lip against which an aft portion of fore right door 26 is configured to overlap such that aft right door 28 must be in a closed position before proper closure of fore right door 26 can be accomplished. In addition, when starting from a completely closed position, fore right door 26 must be at least partially opened before aft right door 28 can be opened. Even though helicopter 10 has been depicted and described as having a particular door configuration; namely, fore right door 26 and aft right door 28, it should be understood by those having ordinary skill in the art that a helicopter of the present disclosure could have other door configurations including configurations having different numbers of right doors such as a configuration including only one right door similar to fore right door 26.

Figure 2A:
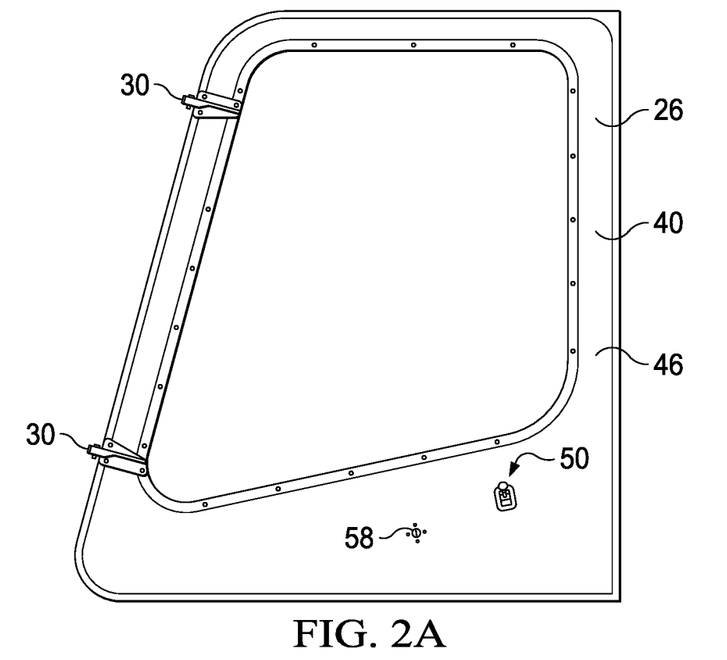
FIGS. 2A-2B are side views of the exterior of a helicopter door having an interior door latch actuation mechanism that operates independently of an exterior door latch actuation mechanism in accordance with embodiments of the present disclosure.
Figure 2B:
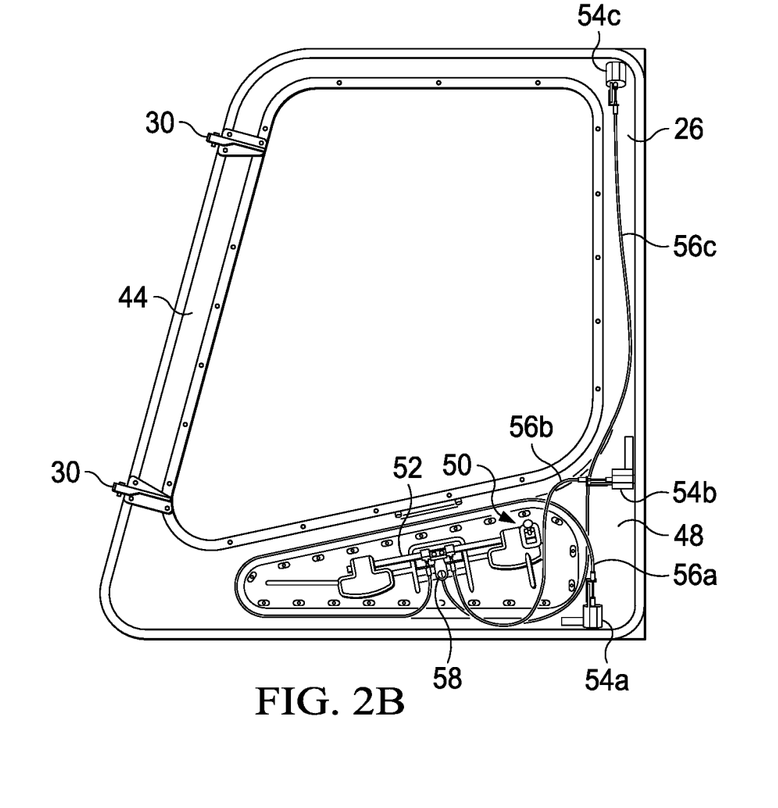
Figure 3A:
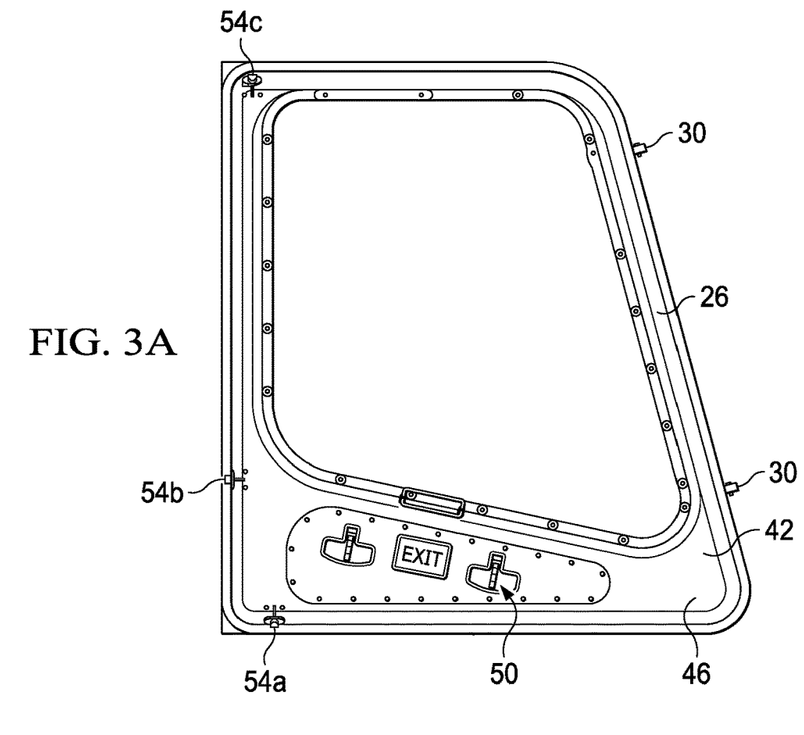
FIGS. 3A-3B are side views of the interior of a helicopter door having an interior door latch actuation mechanism that operates independently of an exterior door latch actuation mechanism in accordance with embodiments of the present disclosure.
Figure 3B:
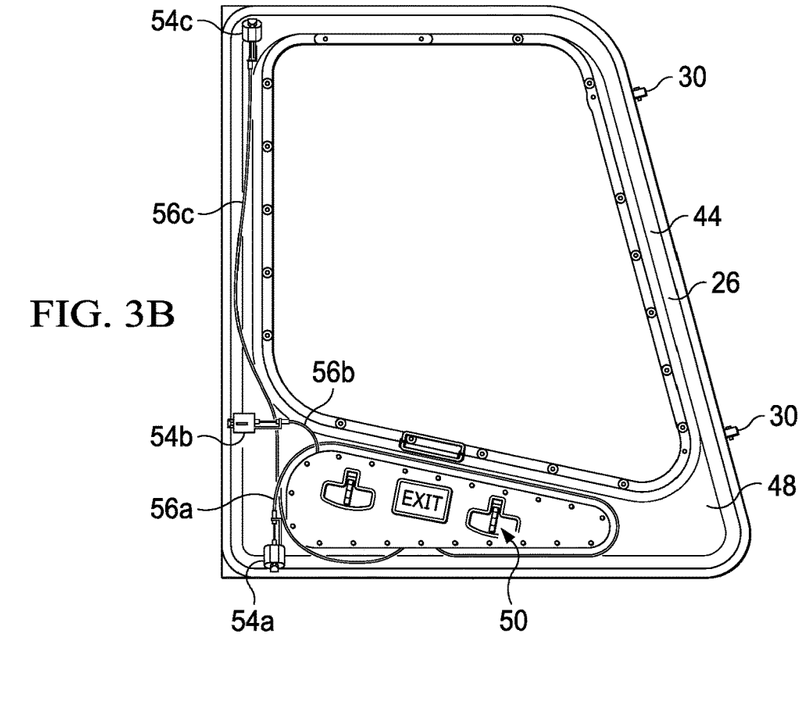

Referring additionally to FIGS. 2A-2B and 3A-3B, fore right door 26 is depicted in greater detail. FIGS. 2A-2B depict an exterior view of fore right door 26 with and without outer panel 40, respectively. FIGS. 3A-3B depict an interior view of fore right door 26 with and without inner panel 42, respectively. Fore right door 26 includes a door latch system 50 configured to selectively control opening, closing and locking of fore right door 26. In the illustrated embodiment, fore right door 26 includes outer panel 40 and inner panel 42 that are coupled to a door frame 44 that form a door assembly 46 having an interior space 48. Door latch system 50 is supported by door assembly 46 and is substantially disposed within interior space 48. In the illustrated embodiment, door latch system 50 includes an actuation module 52 having an interior door latch actuation mechanism that operates independently of an exterior door latch actuation mechanism as discussed herein. Door latch system 50 also includes three latch modules 54a, 54b, 54c each having a retractable latch that selectively engages a receiver of the airframe of helicopter 10 to secure fore right door 26 to the airframe in the closed position, for example, during flight. Door latch system 50 further includes three control cable 56a, 56b, 56c connecting actuation module 52 to respective latch modules 54a, 54b, 54c such that actuation module 52 is operable to retract the latches of latch modules 54a, 54b, 54c from the airframe receivers such that fore right door 26 may be opened. In addition, door latch system 50 includes a lock 58 operably engagable with actuation module 52 to selectively allow and prevent operation of actuation module 52 from the exterior of helicopter 10. Importantly, actuation module 52 may be operated from the interior of helicopter 10 even when lock 58 is engaged as a safety feature of helicopter 10 to enable emergency egress from helicopter 10.

Figure 4A:
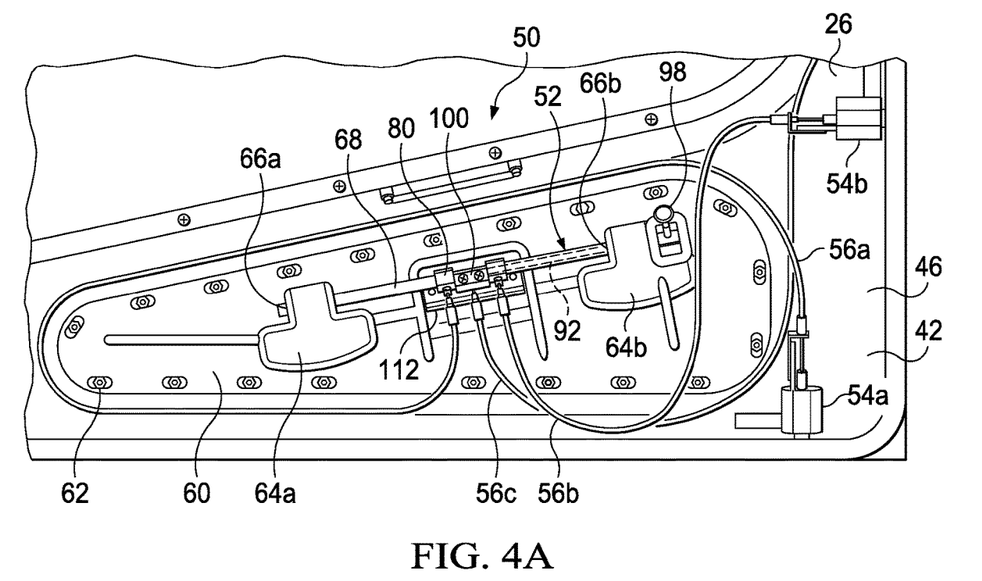
FIGS. 4A-4B are interior and exterior views, respectively, of an interior door latch actuation mechanism that operates independently of an exterior door latch actuation mechanism in accordance with embodiments of the present disclosure.
Figure 4B:
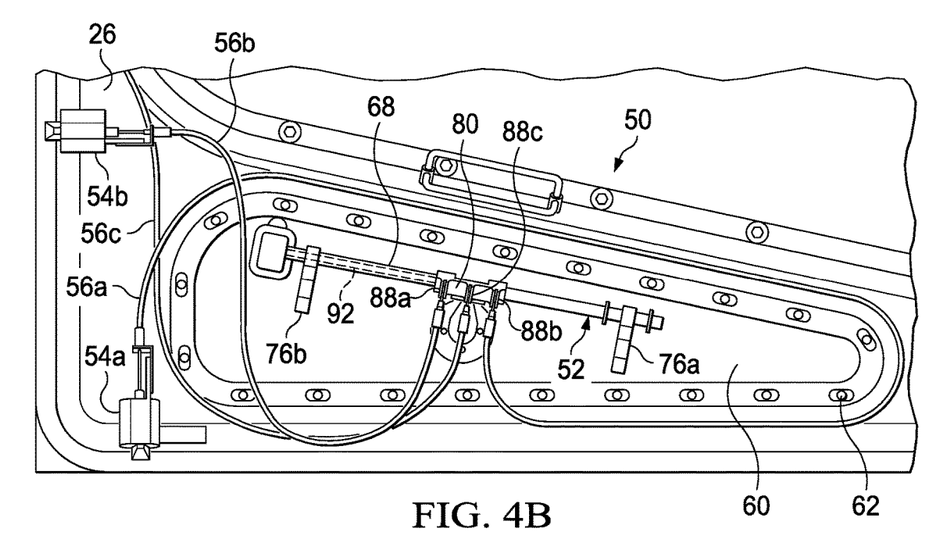

Referring additionally to FIGS. 4A-4B, door latch system 50 is depicted in greater detail. FIG. 4A depicts an exterior view of door latch system 50 with outer panel 40 of fore right door 26 removed. FIG. 4B depicts an interior view of door latch system 50 with inner panel 42 of fore right door 26 removed. Door latch system 50 comprises an actuation module 52, a plurality of latch modules including latch modules 54a, 54b and a plurality of control cables 56a, 56b, 56c. Actuation module 52 is supported by a carrier panel 60 that is configured for attachment to door assembly 46, such as to interior panel 42, with a plurality of fasteners 62. Carrier panel 60 has two handle cavities 64a, 64b integrally formed therein. Handle cavities 64a, 64b form coaxial rod apertures 66a, 66b.

Figure 6A:
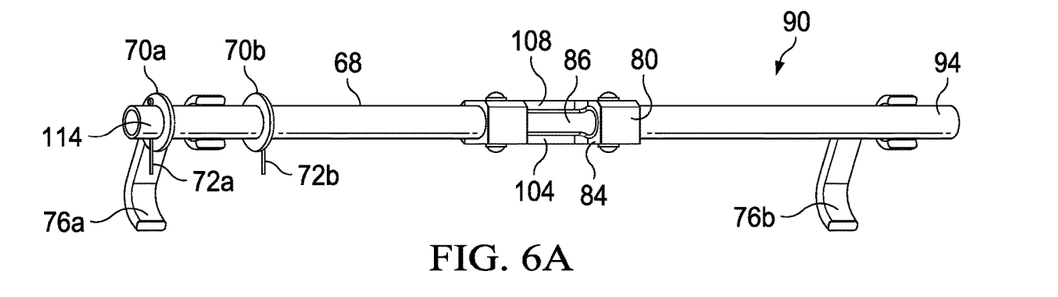
FIGS. 6A-6C are component views of an interior door latch actuation mechanism that operates independently of an exterior door latch actuation mechanism in accordance with embodiments of the present disclosure.
Figure 6B:
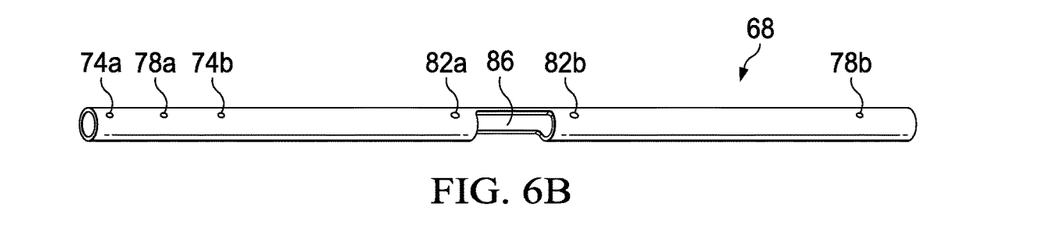

Actuation module 52 includes a hollow outer rod 68 that is received within and is operable to rotate relative to rod apertures 66a, 66b. In the illustrated embodiment, outer rod 68 is longitudinally captured in position relative to carrier panel 60 by washers 70a, 70b and cotter pins 72a, 72b (as best seen in FIG. 6A) that are positioned on either side of handle cavity 64a. Cotter pins 72a, 72b extend through holes 74a, 74b (as best seen in FIG. 6B) in outer rod 68. In the illustrated embodiment, two interior handles 76a, 76b are coupled to outer rod 68 each using a pair of set screws that enter threaded openings in outer rod 68, only the upper threaded openings 78a, 78b being visible in FIG. 6B. In other embodiments, interior handles 76a, 76b could be coupled to outer rod 68 using bolts, pins, adhesive or other suitable fastening means. A conversion block 80 is coupled to outer rod 68 each using two pairs of set screws that enter threaded openings in outer rod 68, only the upper threaded openings 82a, 82b being visible in FIG. 6B. In other embodiments, conversion block 80 could be coupled to outer rod 68 using adhesive, welding or other suitable fastening means. Conversion block 80 includes a slot 84 that is aligned with a slot 86 of outer rod 68, as best seen in FIG. 6A. Conversion block 80 has three cable lugs 88a, 88b, 88c. Together, outer rod 68, interior handles 76a, 76b and conversion block 80 may be referred to herein as an interior door latch actuation mechanism 90.

Figure 6C:
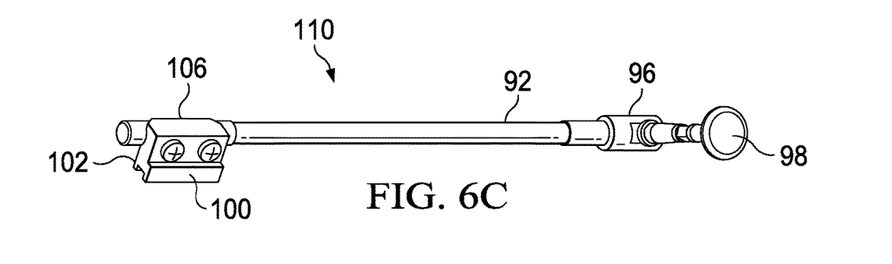

Actuation module 52 also includes a hollow or solid inner rod 92 (as best seen in FIG. 6C) that is received within outer rod 68. Inner rod 92 extends from an aft end 94 of outer rod 68 past slot 86 of outer rod 68 such that inner rod 92 is operable to rotate relative to outer rod 68. In the illustrated embodiment, inner rod 92 has a radially expanded end barrel 96 that supports an exterior handle 98 which may be threadably secured thereto. A lock tab 100 is coupled to inner rod 92 using a pair of set screws that enter threaded openings in inner rod 92, not visible in the figures. Lock tab 100 is at least partially received within slot 84 of conversion block 80 such that in an unactuated position of actuation module 52, a drive surface 102 of lock tab 100 is in contact or near contact with a lower shelf 104 of conversion block 80. In addition, lock tab 100 has a stop surface 106 and conversion block has an upper shelf 108. Together, inner rod 92, exterior handle 98 and lock tab 100 may be referred to herein as an exterior door latch actuation mechanism 110.

As best seen in FIG. 4A, carrier panel 60 carries a cable standoff bracket 112 that is generally shaped as a bent plate. Referring additional to FIGS. 5A-5D, cable standoff bracket 112 includes three barrel slots each configured to receive and retain a barrel of a control cable such as barrel 112a of control cable 56a. Each control cable includes two barrels, such as barrels 112a, 112b of control cable 56a, that are connected to opposite ends of a sleeve, such as sleeve 112c of control cable 56a. Each control cable also includes an interior cable, such as interior cable 112d of control cable 56a, that extends through the barrels and the sleeve terminating on each end with a cylindrical cable head, only cylindrical cable head 112e being visible in the figures. In the illustrated embodiment, one of the cylindrical cable heads of each control cable is coupled to one of the cable lugs 88a, 88b, 88c of conversion block 80 with the other of the cylindrical cable heads of each control cable being coupled to one of the latch modules 54a, 54b, 54c. The control cables generally operate as Bowden cables so that mechanical force is transferred between the cable ends by movement of the interior cable relative to the sleeve. Thus, when actuation module 52 is shifted from an unactuated position to an actuated position, conversion block 80 pulls interior cables such that the latches of latch modules 54a, 54b, 54c are retracted, which releases fore right door 26 from its secure engagement with the airframe of helicopter 10.

Figure 5A:
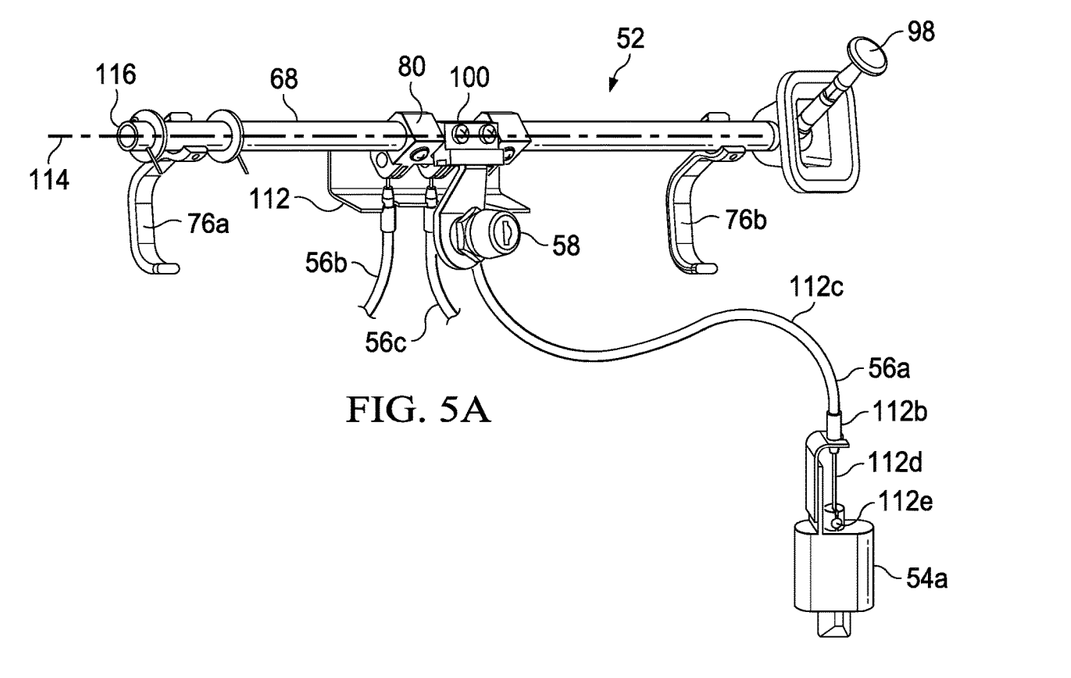
FIGS. 5A-5D are operational views of an interior door latch actuation mechanism that operates independently of an exterior door latch actuation mechanism in its various positions in accordance with embodiments of the present disclosure.

The independent operation of interior door latch actuation mechanism 90 relative to exterior door latch actuation mechanism 110 will now be described with reference to FIGS. 5A-5D. In FIG. 5A, actuation module 52 is in an unactuated and locked position with lock 58 engaged with lock tab 100. In this configuration, exterior door latch actuation mechanism 110 is prevented from engaging in rotary motion by the engagement of lock 58 with lock tab 100. In this locked position, unauthorized entry and/or unauthorized access to the interior of helicopter 10 from the exterior of helicopter 10 is prevent.

Figure 5B:
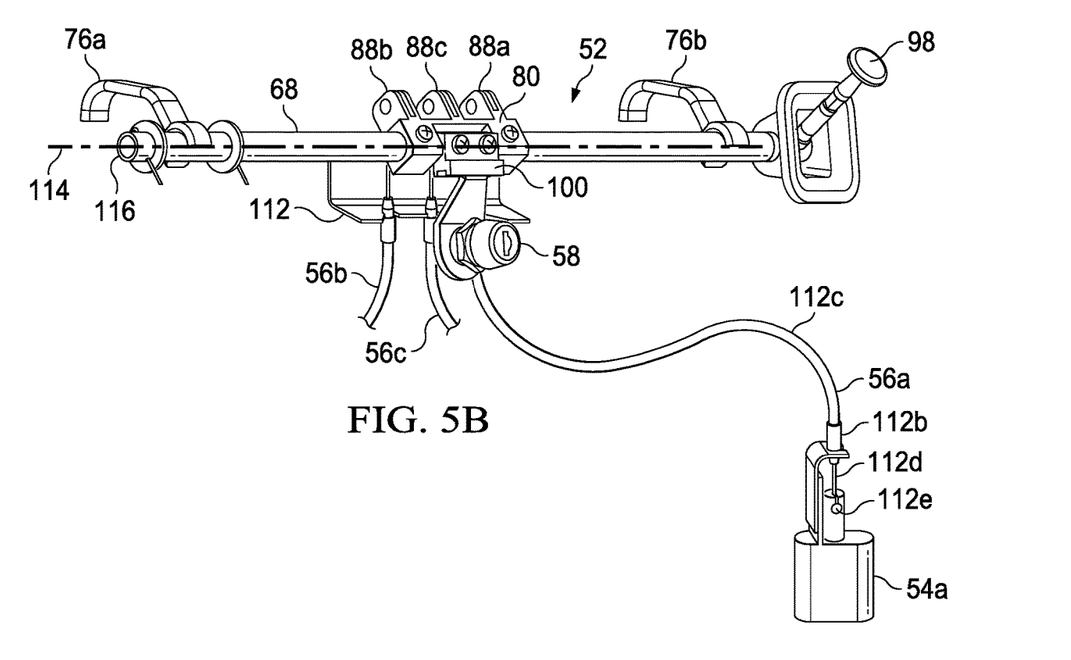

In the unactuated position of actuation module 52, drive surface 102 of lock tab 100 is in contact or near contact with lower shelf 104 of conversion block 80. In addition, there is a gap between stop surface 106 of lock tab 100 and upper shelf 108 of conversion block 80. In the illustrated embodiment, the gap is approximately 90 degrees. In other embodiments, the gap could be greater than or less than 90 degrees depending upon the specific implementation. The gap between stop surface 106 of lock tab 100 and upper shelf 108 of conversion block 80 allows rotation of outer rod 68 relative to inner rod 92 in the clockwise direction about an actuation axis 114 when outer rod 68 is viewed from a fore end 116. As best seen in FIG. 5B, outer rod 68 can be rotated relative to inner rod 92 in the clockwise direction responsive to lifting interior handles 76a, 76b. Rotation of outer rod 68 in the clockwise direction causes conversion block 80 to rotate in the clockwise direction, which lifts cable lugs 88a, 88b, 88c, thereby pulling the interior cables such that the latches of the latch modules are retracted, such as the latch of latch module 54a (as best seen by comparing FIGS. 5A and 5B). In this manner, interior door latch actuation mechanism 90 is operable to retract the latches of latch modules 54a, 54b, 54c to releases fore right door 26 from its secure engagement with the airframe of helicopter 10 even when actuation module 52 is in a locked position with lock 58 engaged with lock tab 100.

Figure 5C:
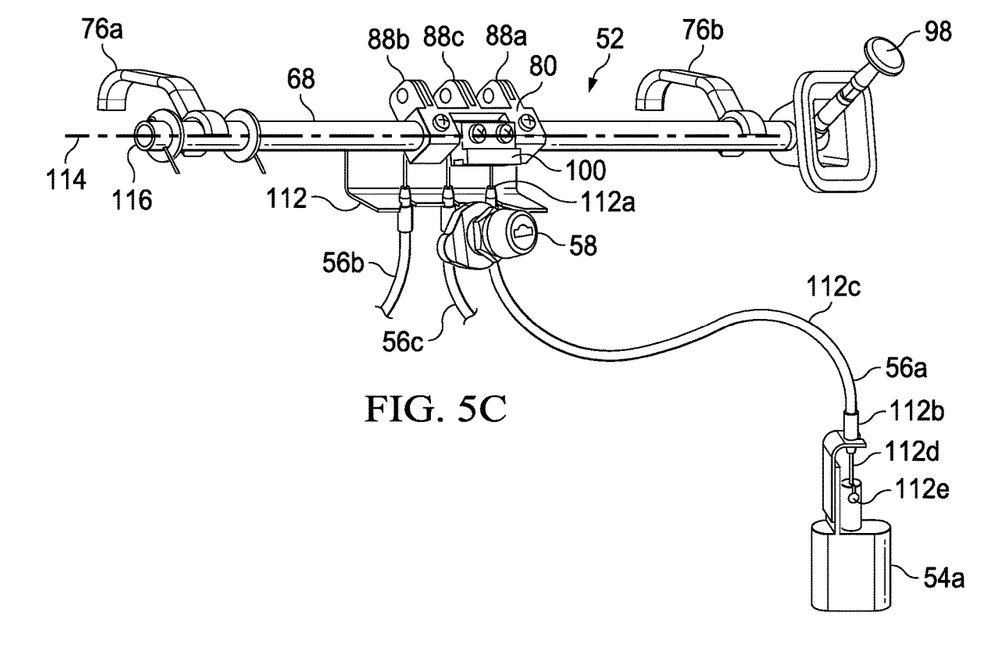

As best seen in FIG. 5C, actuation module 52 has been placed in an unlocked state by rotating the lock componentry out of the rotational path of lock tab 100. As there is a gap between stop surface 106 of lock tab 100 and upper shelf 108 of conversion block 80 in the unactuated state of actuation module 52, rotation of outer rod 68 in the clockwise direction relative to inner rod 92 causes conversion block 80 to rotate in the clockwise direction, which lifts cable lugs 88a, 88b, 88c, thereby pulling the interior cables such that the latches of the latch modules are retracted, such as the latch of latch module 54a (as best seen by comparing FIGS. 5A and 5C). In this manner, interior door latch actuation mechanism 90 is operable to retract the latches of latch modules 54a, 54b, 54c to releases fore right door 26 from its secure engagement with the airframe of helicopter 10 when actuation module 52 is in the unlocked position.

Figure 5D:
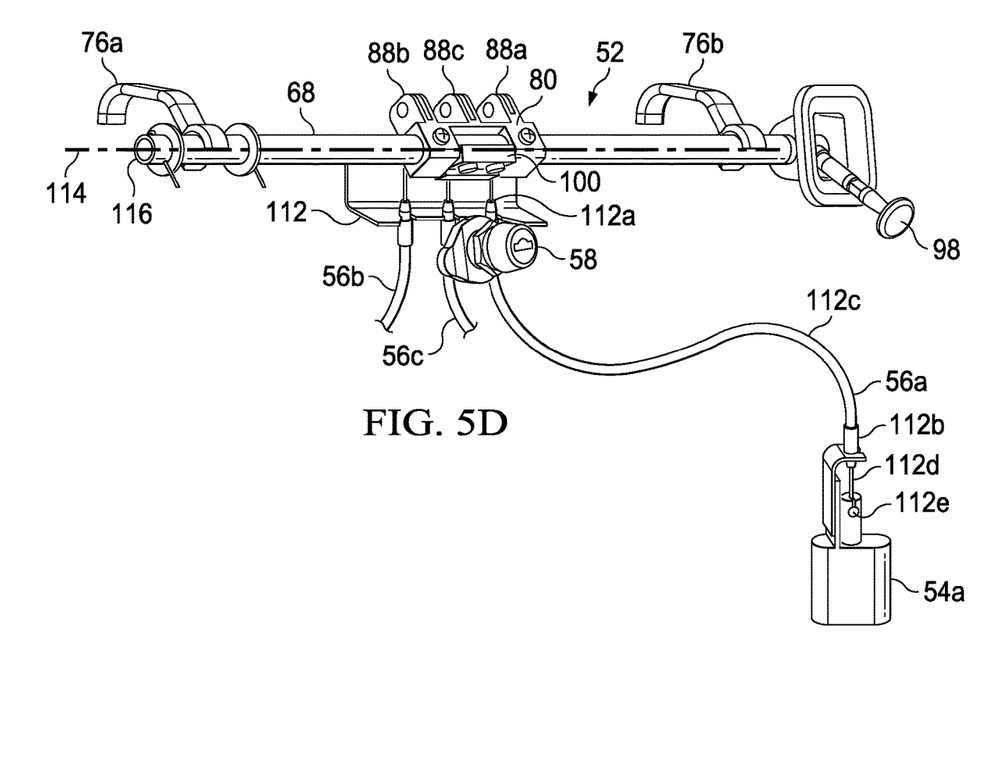

As best seen in FIG. 5D, actuation module 52 remains in the unlocked state. As drive surface 102 of lock tab 100 is in contact or near contact with lower shelf 104 of conversion block 80 in the unactuated state of actuation module 52, rotation of inner rod 92 in the clockwise direction, responsive to downwardly shifting exterior handle 98, causes rotation of conversion block 80 as well as outer rod 68 in the clockwise direction. This operation lifts cable lugs 88a, 88b, 88c, thereby pulling the interior cables such that the latches of the latch modules are retracted, such as the latch of latch module 54a (as best seen by comparing FIGS. 5A and 5D). In this manner, exterior door latch actuation mechanism 110 is operable to retract the latches of latch modules 54a, 54b, 54c to releases fore right door 26 from its secure engagement with the airframe of helicopter 10 when actuation module 52 is in the unlocked position.

Even though helicopter 10 is illustrated as an exemplary aircraft that may employ an interior door latch actuation mechanism that operates independently of an exterior door latch actuation mechanism in accordance with embodiments of the present disclosure, it should be appreciated that any type of aircraft may use the illustrative embodiments to secure a door in the closed position to an airframe, lock the door to prevent unauthorized access to the aircraft and provide emergency egress from the aircraft even when the door is locked. In addition, it should be appreciated that the illustrative embodiments disclosed herein may be incorporated into non-aircraft vehicles such as ground vehicles, water-based vehicles and the like. Further, it should be appreciated that the illustrative embodiments disclosed herein may be incorporated into non-vehicle structures, such as enclosed areas, to prevent unauthorized entry while providing emergency egress.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A latch system comprising:
   an actuation module having first and second actuation mechanisms, the first actuation mechanism including a first handle, a lock tab and an inner rod coupled together, the second actuation mechanism including at least one second handle, a conversion block and an outer rod coupled together, the outer rod and the conversion block each having a slot;
   at least one latch module having a retractable latch;
   at least one control cable connecting the conversion block and the at least one latch module such that rotation of the conversion block in a first direction retracts the latch; and
   a lock operably engagable with the lock tab to selectively allow and prevent rotation of the inner rod;
   wherein, the inner rod is at least partially disposed within the outer rod with the slot of the conversion block aligned with the slot of the outer rod and with the lock tab at least partially disposed within the aligned slots of the conversion block and the outer rod such that rotation of the inner rod in the first direction rotates the conversion block; and
   wherein, rotation of the outer rod in the first direction rotates the conversion block without rotating the inner rod such that the second actuation mechanism operates independently of the first actuation mechanism.

2. The latch system as recited in claim 1 wherein the first actuation mechanism is rotatable about an actuation axis and wherein the second actuation mechanism is rotatable about the actuation axis.

3. The latch system as recited in claim 1 wherein the at least one latch module further comprises a plurality of latch modules each having a retractable latch, wherein the at least one control cable further comprises a plurality of control cables and wherein each control cable is connected between the conversion block and one of the latch modules such that rotation of the conversion block in the first direction retracts each of the latches.

4. The latch system as recited in claim 1 wherein, when the lock is engaged, rotation of the first actuation mechanism is prevented, thereby disabling the first actuation mechanism from retracting the latch.

5. The latch system as recited in claim 1 wherein, when the lock is not engaged, rotation of the first actuation mechanism is allowed such that the first actuation mechanism is operable to retract the latch.

6. The latch system as recited in claim 1 wherein, when the lock is engaged, the second actuation mechanism is operable to retract the latch and wherein, when the lock is not engaged, the second actuation mechanism is operable to retract the latch.

7. The latch system as recited in claim 1 wherein the first handle further comprises an exterior handle and wherein the at least one second handle further comprises at least one interior handle.

8. A door latch system for a door of an aircraft having an airframe, the door latch system comprising:
   an actuation module having first and second actuation mechanisms, the first actuation mechanism including a first handle, a lock tab and an inner rod coupled together, the second actuation mechanism including at least one second handle, a conversion block and an outer rod coupled together, the outer rod and the conversion block each having a slot;
at least one latch module having a retractable door latch operable to secure the door to the airframe in a closed position;
at least one control cable connecting the conversion block and the at least one latch module such that rotation of the conversion block in a first direction retracts the door latch to release the door from the airframe; and
a lock operably engagable with the lock tab to selectively allow and prevent rotation of the inner rod;
wherein, the inner rod is at least partially disposed within the outer rod with the slot of the conversion block aligned with the slot of the outer rod and with the lock tab at least partially disposed within the aligned slots of the conversion block and the outer rod such that rotation of the inner rod in the first direction rotates the conversion block; and
wherein, rotation of the outer rod in the first direction rotates the conversion block without rotating the inner rod such that the second actuation mechanism operates independently of the first actuation mechanism.

9. The door latch system as recited in claim 8 wherein the first actuation mechanism is rotatable about an actuation axis and wherein the second actuation mechanism is rotatable about the actuation axis.

10. The door latch system as recited in claim 8 wherein the at least one latch module further comprises a plurality of latch modules each having a retractable door latch, wherein the at least one control cable further comprises a plurality of control cables and wherein each control cable is connected between the conversion block and one of the latch modules such that rotation of the conversion block in the first direction retracts each of the door latches.

11. The door latch system as recited in claim 8 wherein, when the lock is engaged, rotation of the first actuation mechanism is prevented, thereby disabling the first actuation mechanism from retracting the door latch.

12. The door latch system as recited in claim 8 wherein, when the lock is not engaged, rotation of the first actuation mechanism is allowed such that the first actuation mechanism is operable to retract the door latch.

13. The door latch system as recited in claim 8 wherein, when the lock is engaged, the second actuation mechanism is operable to retract the door latch and wherein, when the lock is not engaged, the second actuation mechanism is operable to retract the door latch.

14. The door latch system as recited in claim 8 wherein the first handle further comprises an exterior handle and wherein the at least one second handle further comprises at least one interior handle.

15. An aircraft door for hingeably coupling with an airframe of an aircraft, the aircraft door comprising:
a door assembly; and
a door latch system supported by the door assembly, the door latch system including:
an actuation module having first and second actuation mechanisms, the first actuation mechanism including a first handle, a lock tab and an inner rod coupled together, the second actuation mechanism including at least one second handle, a conversion block and an outer rod coupled together, the outer rod and the conversion block each having a slot;
at least one latch module having a retractable door latch operable to secure the door to the airframe in a closed position;
at least one control cable connecting the conversion block and the at least one latch module such that rotation of the conversion block in a first direction retracts the door latch to release the door from the airframe; and
a lock operably engagable with the lock tab to selectively allow and prevent rotation of the inner rod;
wherein, the inner rod is at least partially disposed within the outer rod with the slot of the conversion block aligned with the slot of the outer rod and with the lock tab at least partially disposed within the aligned slots of the conversion block and the outer rod such that rotation of the inner rod in the first direction rotates the conversion block; and
wherein, rotation of the outer rod in the first direction rotates the conversion block without rotating the inner rod such that the second actuation mechanism operates independently of the first actuation mechanism.

16. The aircraft door as recited in claim 15 wherein the first actuation mechanism is rotatable about an actuation axis and wherein the second actuation mechanism is rotatable about the actuation axis.

17. The aircraft door as recited in claim 15 wherein, when the lock is engaged, rotation of the first actuation mechanism is prevented, thereby disabling the first actuation mechanism from retracting the door latch.

18. The aircraft door as recited in claim 15 wherein, when the lock is not engaged, rotation of the first actuation mechanism is allowed such that the first actuation mechanism is operable to retract the door latch.

19. The aircraft door as recited in claim 15 wherein, when the lock is engaged, the second actuation mechanism is operable to retract the door latch and wherein, when the lock is not engaged, the second actuation mechanism is operable to retract the door latch.

20. The aircraft door as recited in claim 15 wherein the first handle further comprises an exterior handle and wherein the at least one second handle further comprises at least one interior handle.

* * * * *